(12) United States Patent
Vu et al.

(10) Patent No.: US 6,852,260 B2
(45) Date of Patent: Feb. 8, 2005

(54) PROCESS FOR PREPARING CLEANSING BARS HAVING WELL-DEFINED PLATELET STRIATIONS THEREIN

(75) Inventors: Liem Vu, Berkeley Heights, NJ (US); Matthew Edstrom, Evanston, IL (US); Armando San Juan, Cranford, NJ (US)

(73) Assignee: Colgate-Palmolive Company, New York, NY (US)

( * ) Notice: Subject to any disclaimer, the term of this patent is extended or adjusted under 35 U.S.C. 154(b) by 276 days.

(21) Appl. No.: 10/143,247

(22) Filed: May 10, 2002

(65) Prior Publication Data

US 2003/0004074 A1 Jan. 2, 2003

Related U.S. Application Data

(60) Provisional application No. 60/302,130, filed on Jun. 29, 2001.

(51) Int. Cl.[7] .......................... B29C 47/04; B29C 47/38; B29C 47/70
(52) U.S. Cl. ...................... 264/245; 264/75; 264/171.1; 425/131.1; 425/197; 425/198; 425/199; 425/208; 425/465; 510/146
(58) Field of Search ............................... 264/75, 171.1, 264/245; 425/131.1, 208, 465, 197, 198, 199; 510/146

(56) References Cited

U.S. PATENT DOCUMENTS

| | | | | |
|---|---|---|---|---|
| 2,332,829 A | * | 10/1943 | Parsons et al. ............. 264/108 |
| 3,268,970 A | * | 8/1966 | Kelly et al. ............... 425/131.1 |
| 3,823,215 A | * | 7/1974 | D'Arcangeli ................ 264/75 |
| 3,832,431 A | * | 8/1974 | Matthaei ...................... 264/75 |
| 3,884,605 A | | 5/1975 | Grelon et al. ............ 425/131.1 |
| 3,923,438 A | * | 12/1975 | Perla ........................ 425/131.1 |
| 3,940,220 A | * | 2/1976 | D'Arcangeli ............. 425/131.1 |
| 4,011,170 A | * | 3/1977 | Pickin et al. ................ 510/146 |
| 4,077,753 A | * | 3/1978 | Tanaka ...................... 425/131.1 |
| 4,162,288 A | | 7/1979 | Hunt et al. .................... 264/75 |
| 4,196,163 A | * | 4/1980 | Finkensiep et al. .......... 264/148 |
| 4,304,745 A | * | 12/1981 | Alderson et al. ............. 264/75 |
| 4,474,545 A | * | 10/1984 | Mazzoni .................. 425/131.1 |
| 4,720,365 A | * | 1/1988 | Schonig et al. ............... 264/75 |
| 4,879,063 A | | 11/1989 | Wood-Rethwill et al. ... 252/370 |
| 5,196,131 A | | 3/1993 | Baumgartner et al. ...... 510/146 |
| 5,242,614 A | | 9/1993 | Baumgartner et al. ...... 510/146 |
| 5,246,361 A | * | 9/1993 | Marchesani .............. 425/131.1 |
| 6,706,675 B1 | * | 3/2004 | Demson et al. ............. 510/147 |

FOREIGN PATENT DOCUMENTS

| | | | | |
|---|---|---|---|---|
| DE | 2006666 A | * | 8/1971 | ........... B63H/25/46 |
| GB | 1387567 A | | 3/1975 | |
| GB | 1437323 A | * | 5/1976 | ........... C11D/13/18 |

OTHER PUBLICATIONS

Derwent Abstract of DE 2006666 A, 1971, Derwent Information Limited, Derwent Week# 197134.*

* cited by examiner

Primary Examiner—Michael P. Colaianni
Assistant Examiner—Michael I. Poe

(57) ABSTRACT

A process for preparing a cleansing bar having well-defined platelet striations therein which comprises extruding a cleansing bar composition having platelets therein to form a cleansing bar using an extruder having a perforated barrier across the cross section of the extruder, wherein the perforated barrier is located at a sufficient distance downstream from the spider to allow well-defined platelet striations to be observed in the finished cleansing bar with the human eye. The perforated barrier is located at a distance from the spider equal to at least about 60%, preferably at least about 70%, of the distance from the spider to the extruder cone outlet of the extruder. Generally, a standard extruder cone length from spider to cone outlet is about 483 mm to about 560 mm.

4 Claims, 5 Drawing Sheets

PROCESS FOR PREPARING CLEANSING BARS HAVING WELL-DEFINED PLATELET STRIATIONS THEREIN

This application claims benefit of Provisional Application 60/302,130 filed Jun. 29, 2001.

BACKGROUND OF THE INVENTION

Solid hand held skin cleaning compositions have been marketed for decades. Liquid skin cleansing compositions have made some inroads into sales of solid compositions, particularly in certain geographical areas. However, solid skin cleansing compositions, particularly bars, remain a preferred vehicle for skin cleansing worldwide.

In order to maintain and enhance continued sales of solid skin cleansing compositions, various improvements have been made such as use of mildness enhancing agents such as certain surfactants, free fatty acids, and the like as well as skin benefit agents and conditioning agents such as cationic polymers and oily material such as mineral oil and petrolatum. Efforts to make these bars more attractive such as translucent and transparent bars are also available. Particles such as mica, bismuth oxychloride, kaolin and the like have also been added to these compositions in order to enhance their attractiveness.

In an attempt to create striations in soap, U.S. Pat. No. 4,879,063 discloses a method for preparing a striated translucent bar utilizing a perforated plate situated next to and downstream from the spider, the part in the extruder which holds the screw in place. U.S. Pat. Nos. 5,196,131 and 5,242,614 disclose a soap having the alleged appearance of a polished wood grain prepared using a perforated plate situated next to and downstream from the spider and producing striations in the bar with an iron oxide coated micaceous pearlescent pigment which is oriented generally unidirectional. As aforestated, the perforated plate is next to the spider holding down the end of the screw. Translucent soap bars are clearly preferred over opaque because the resulting wood grain appearance is brighter and sharper. However, it is believed that in no situations are there clear, uniform and relatively thick striations, which can be observed by the human eye.

We have discovered a method of placing sharp, distinctive striations into a cleansing bar using substantially lower levels of platelet reflecting material than utilized previously and obtaining an even sharper more better defined striation than obtained previously. The benefits occur in opaque as well as translucent bars. The process utilizes a perforated barrier located a substantial displacement from the spider of the extruder. Such placement of the perforated barrier allows the striations to be clear and sharply defined.

SUMMARY OF THE INVENTION

In accordance with the invention there is a process for preparing a cleansing bar having well defined platelet striations therein which comprises extruding a cleansing bar having platelets therein using an extruder having a perforated barrier across the cross section of the extruder, the barrier a sufficient distance from the spider so that well-defined platelet striations are observed in the finished bar with the human eye. Generally the perforated barrier is located at least about 60% preferably at least about 70% from the spider, as measured from the spider to the extruder cone outlet. Generally, a standard extruder cone length from spider to cone outlet is about 483 mm to about 560 mm.

Further, in accordance with the invention, there is a process for preparing a cleansing bar having well defined platelet striations therein which comprises extruding a cleansing bar composition having platelets therein through an extruder which comprises having disposed within the extruder cone a smaller cone and having a perforated barrier across the cross section of the extruder cone or the smaller cone said perforated barrier substantially displaced downstream from the extruder spider, at least about 60% of the distance from the spider, as measured from the spider to the extruder cone outlet so as to prepare a cleansing bar having well defined striations therein.

A further aspect of the invention is an extruder suitable for extruding cleansing bar compositions having attached to the end of its cone a second cone having disposed in the extruder cone or the attached cone a perforated barrier across the cross section of the extruder cone or the smaller attached cone, said perforated barrier in each situation substantially displaced downstream from the extruder spider, at least about 60% of the distance from the spider as measured from the spider to the extruder cone outlet so as to prepare a cleansing bar having well defined striations therein.

An additional aspect of the invention is a cleansing bar having disposed therein and clearly defined to the human eye striations of a platelet.

Still further, an additional aspect of the invention is an extruder suitable for extruding a cleansing bar composition; said extruder having a perforated barrier disposed therein across the cross section of the extruder, the said barrier being located downstream from the spider holding the screw and the barrier being at least 60% of the distance between the spider and the extruder cone outlet.

DETAILED DESCRIPTION OF THE INVENTION

Figure 1:
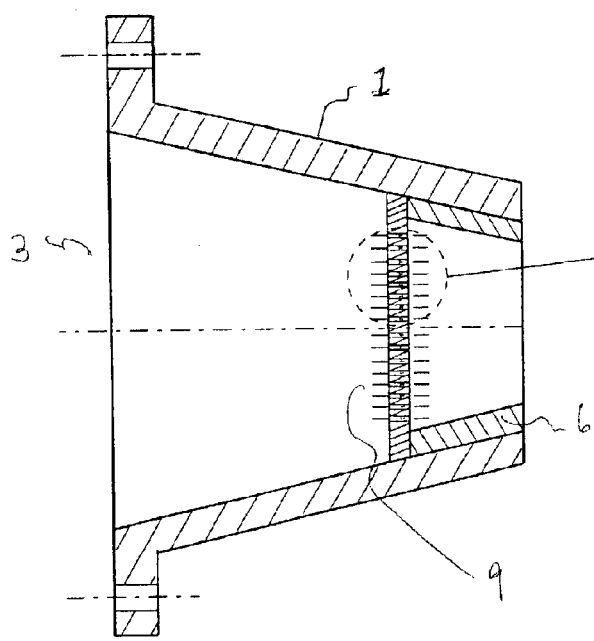
FIG. 1 is a view of a cone fitting within the cone of an extruder wherein a perforated barrier is present across the full cross section.

The aesthetics of a cleansing bar are extremely important to its acceptance and continual purchase by consumers. A bar's shape, color and fragrance are among the features, which appeal to the senses of touch, sight and smell. However, other aspects of visual appeal can also be accentuated. Striations are lines of a solid platelet material in a bar. When present, these can present an additional attractive feature, which is appealing to the consumer and provides an additional point of differentiation over competitor's offerings. However, obtaining well-defined striations is not easily done and has not been accomplished through known processes. Following the prior art teachings previously mentioned does not bring about a well-defined, visually attractive bar under commercial extrusion conditions, particularly in an opaque bar. The platelet material can barely be seen by the naked eye and there are no well-defined lines. In using this invention, the particles are readily observed by the naked eye in well-defined lines. These lines are not just on the surface but can be maintained in at least essentially the same definition throughout the bar, each separate use or series of bar uses revealing a new layer(s) of soap with striations. This can be accomplished with a minimum of platelets, substantially less than used in the prior art.

The type of particle, which can be added to the cleansing composition for striation purposes, is any type of platelet, which has an aspect ratio that allows it to be aligned under pressure. Generally, these are pearlescent platelets on an inorganic base, such as mica, bismuth oxychloride, kaolin, and the like. The mica is the preferred platelet and can be coated with titanium dioxide to be even more light reflective. This is available from Engelhard with the preferred material being Timica Extra Bright 1500. Englehard information says the Timica particle size range is about 8 to 48 microns and an average thickness of about 0.62 microns. Other coatings include iron oxide on the micaceous pearlescent pigment. The aspect ratio of the platelet is sufficient to easily align the platelet when forced through the perforations in the barrier while under pressure. The quantity of platelets, which can be used, is quite low, particularly with respect to the quantities noted in the above-noted patents and specifically with respect to opaque soaps. The quantity of platelet used covers at least that quantity which provides a better visually defined striation in a bar than produced with the same quantity of platelet using the process of the above noted patents. Generally the platelet is a minimum of about 0.1 wt % of the composition, or about 0.15, 0.2 or 0.25 wt % of the composition. A maximum amount is dependent upon the number, width, and depth of striations one wishes to have. Generally no more than about 3 wt % is employed. Less than about 2 or 1 wt % also can be employed.

The perforated barrier is inserted into the cone and extends the full cross section of the cone. The standard extruder generally is sufficient to bring about desired striations.

The closer the perforated barrier to the exit point of the cone, the more well defined the striation. The perforated barrier is located sufficiently distant from the cone exit point so as to have a complete cross-section of bar composition leaving the cone exit. The composition is desirably not in separate strands. The size and shape of the cone exit cross-section approximates the size and shape of the billet, which is further processed into the soap bar. A round cross section is preferred. Preferably, the cone exit is the same size and shape as the billet.

Various embodiments of the invention can be employed. A preferred embodiment is a cone within the extruder cone. This cone can be fitted in at the exit point. This additional cone providing a "cone within a cone" apparatus can be readily inserted and removed thereby increasing flexible use of the extruder. The inner diameter of the cone can be essentially the same taper as the extruder or it can be increased. The increased taper of the inner cone reduces the amount of dead spots thereby reducing eddies. Therefore an even more defined striation will occur. The perforated barrier is placed at least the aforestated minimum distance from the spider but it is preferred to place the barrier at the entrance to the inner cone or within the inner cone as long as the composition exits the cone exit as a single mass.

A more preferred embodiment is where an additional cone is attached to the outlet area of the extruder cone. This cone can have the same taper as the extruder cone or can have an increased taper. The perforated barrier can be located inside the extruder cone, at the juncture point of the attached cone or within the attached cone. The exit point of the attached cone approximates the size and the shape of the billet. A round billet is preferred. The composition should exit the attached cone outlet as a single mass. The use of an attached cone is more advantageous since it more easily attaches or removes in comparison to the inner cone.

The cone within the extruder cone and the attached cone are substantially shorter than the extruder cone. For example, it is generally no longer than about 40% of the distance between the spider and the cone extruder outlet. It is generally desirable to have the cone within the cone and the attached cone no longer than about 15 to 20% of the distance between the extruder spider and the extruder cone outlet. They can be a shorter length if desired.

The bar composition generally has at least some soap in it, preferably from about 5 to about 95 wt. % of the composition. The processing parameters are conventional as used in the preparation of any soap bar. The bars can be opaque or translucent. Opaque bars are preferred.

The barrier is made up of any material, which can withstand the temperatures and pressures of the processing. Steel can be used.

The cross sections of the perforations usually circular are in the range of about 0.5 to about 10 mm, desirably about 1, 1.5 or 2.5 as minimums, with a maximum up to about 7.5 mm in diameter. The number of perforations, the placement of the perforations in the barrier in specific patterns and the spacing of the perforation influence the thickness of the striation in the final cleansing bar. The striations can be essentially only on the surface of the bar but can also be any distance through the depth of the bar and including completely throughout the depth of the bar.

With respect to the Figures, FIG. 1 shows an extruder cone, 1, having a spider, 3, and disposed within the extruder cone a shorter cone, 6, and a perforated barrier, 9, at the juncture of the shorter cone.

Figure 2:
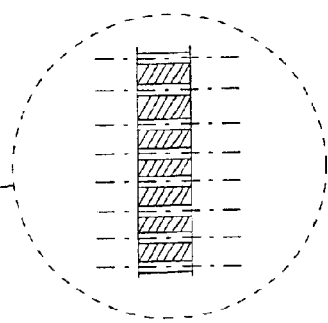
FIG. 2 is a close up of the perforated barrier of FIG. 1 showing the alignment and passage through the perforations of a cleansing composition having platelets.

FIG. 2 is a close-up perspective of the perforated barrier showing the soap composition with platelets passing through the perforations.

Figure 3:
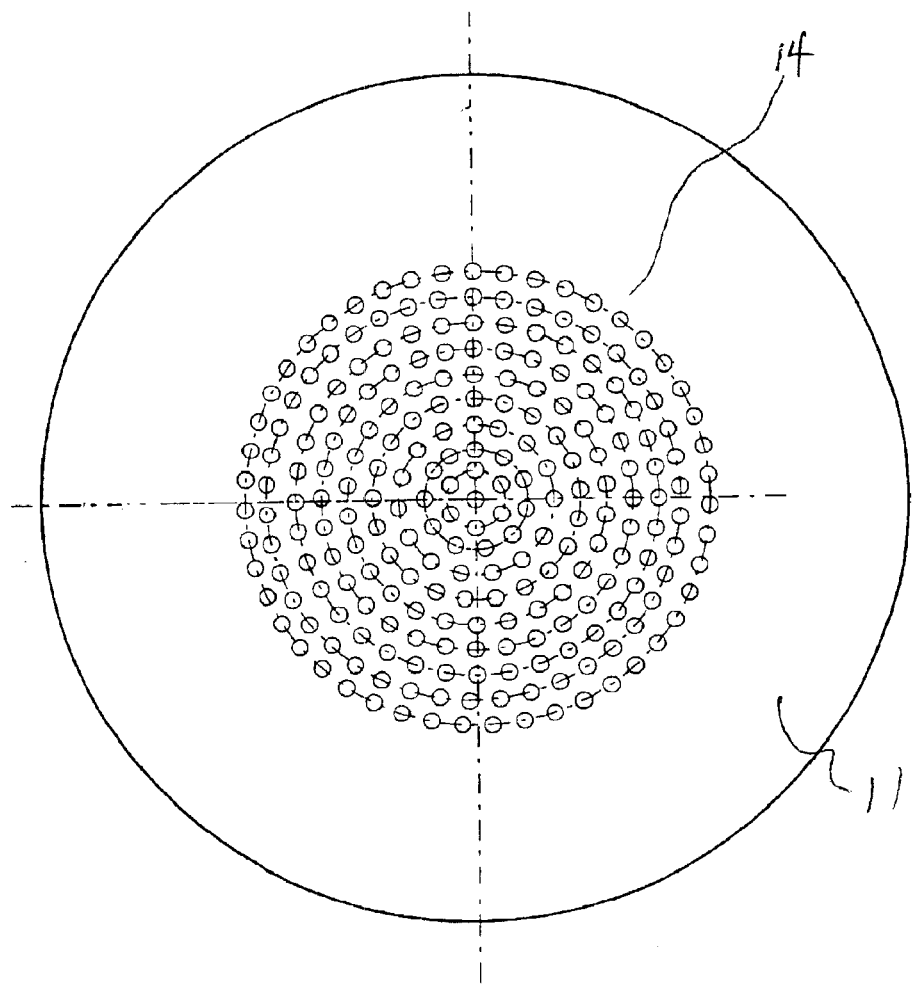
FIG. 3 is an example of a perforated barrier having a series of 4.75 mm diameter holes.

FIG. 3 provides a view of a perforated barrier, 11, with perforations, 14.

Figure 4:
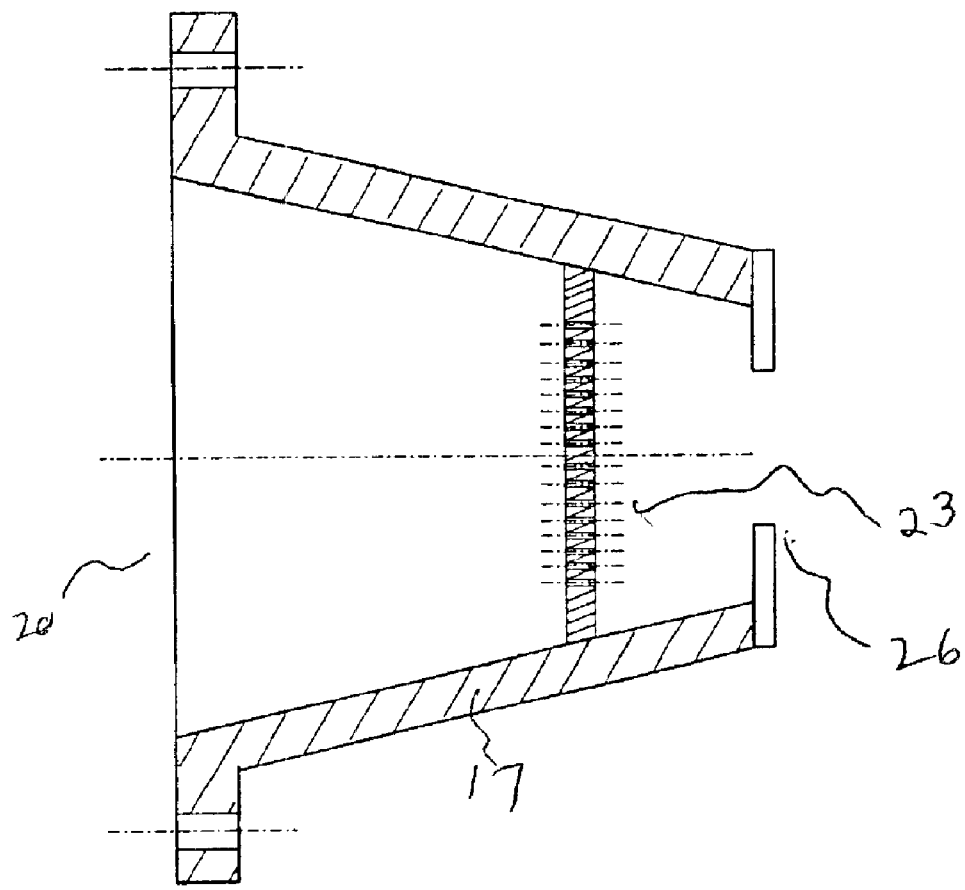
FIG. 4 is a view of an extruder cone with a perforated barrier inside the extruder at an appropriate distance away from the spider.

FIG. 4 shows an extruder cone, 17, with a spider, 20, a perforated barrier, 23, and the extruder cone outlet, 26.

Figure 5:
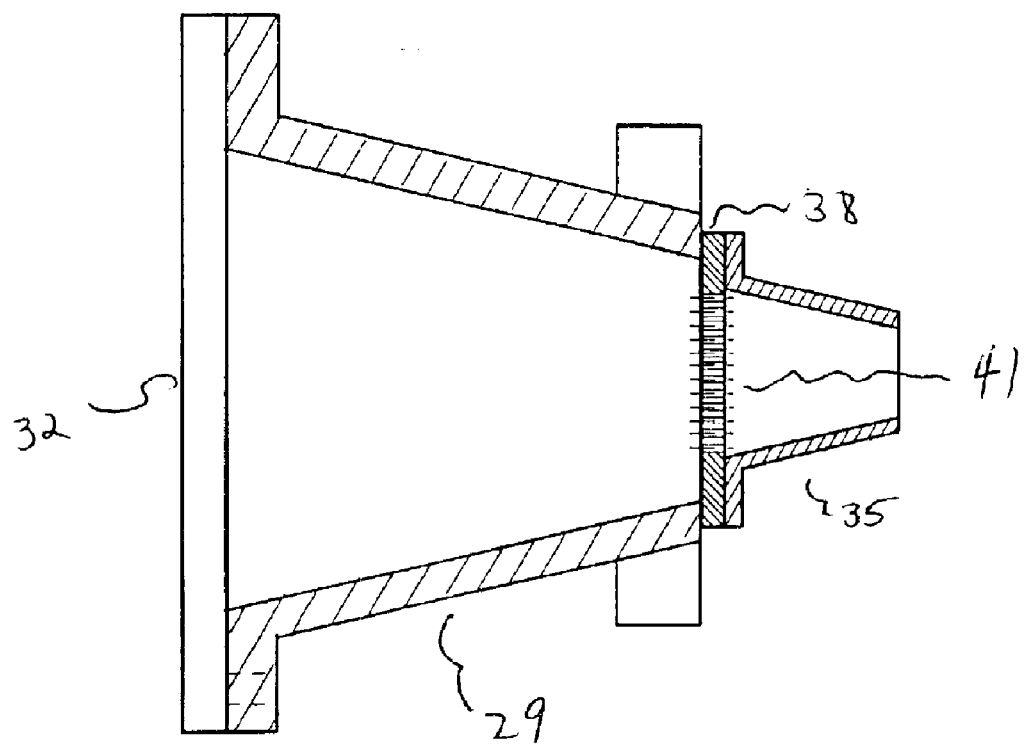
FIG. 5 is an extruder with a cone attached to the extruder cone outlet and the perforated barrier is located at the junction point of the attached cone and extrusion cone outlet.

FIG. 5 shows an extruder cone, 29, with a spider, 32, and a cone, 35, attached to the extruder cone at the extruder cone outlet, 38, and a perforated barrier, 41.

Figure 6:
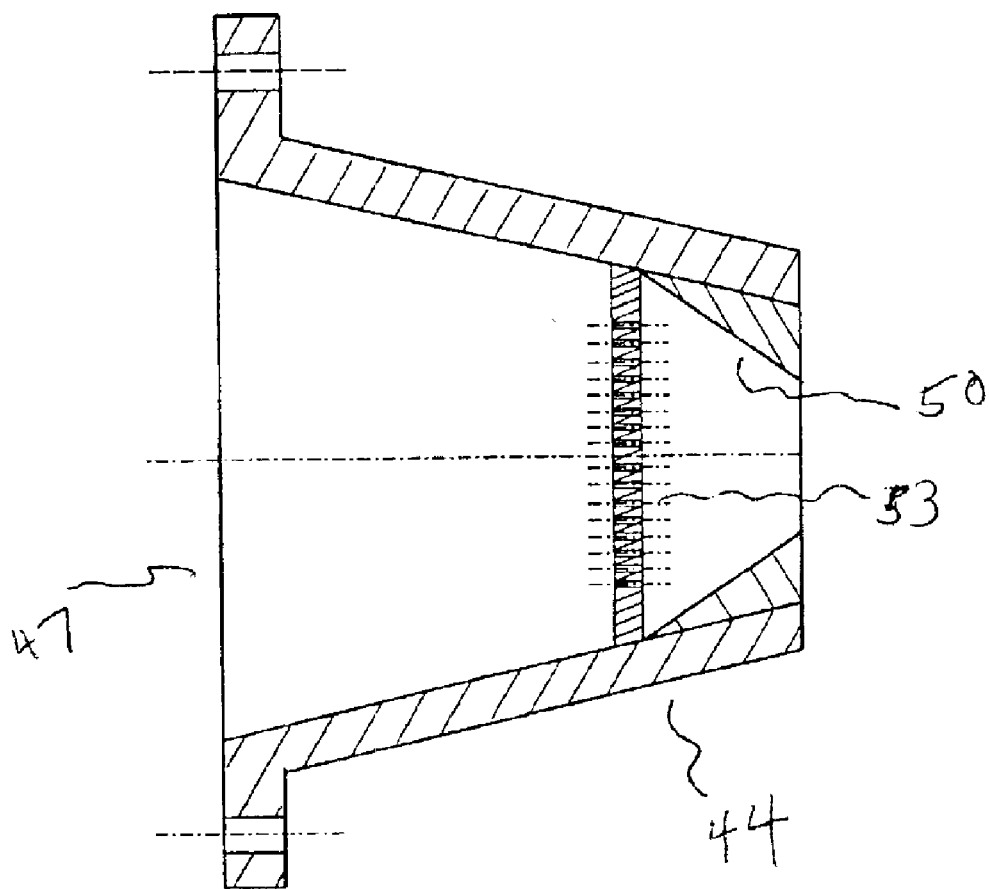
FIG. 6 is a view of a cone with increased taper fitting within the extruder cone and a perforated barrier.

FIG. 6 shows an extruder cone, 44, a spider, 47, a cone within the extruder cone showing an increased taper, 50, and a perforated barrier, 53.

Below are specific examples of the invention, 1 and 2. A comparative example is 3.

EXAMPLE 1

The 80/20 tallow/coconut fatty acid blend sodium soap pellets were used. These soap pellets contained 18–19% moisture, 5% glycerin, 1% superfat. The glycerin was added to the neat soap, and the superfat was generated via in-situ with citric acid with the neat soap at the crutcher. These soap pellets were amalgamated with fragrance and 20% titanium dioxide coated mica slurry which consisted of 0.2% mica with 0.4% glycerin and 0.4% water (by weight on the finished bar), and colorant. After the amalgamation, the soap mixture was refined in a 10-inch duplex refiner with 0.6 mm and 0.4 mm screen were installed in the top and bottom stage respectively. The refined soap mixture was then passed through the 10-inch duplex vacuum plodder in which the perforated barrier and the attached cone were attached at the end of the original extrusion cone that is, the extrusion cone outlet. The perforated barrier has 4 mm diameter holes, 47 holes in the largest perimeter holes and total of 237 holes. The attached cone has an outlet diameter of 42 mm, a length of 80 mm and the cone angle (from the cone base) of 64.5 degrees. The soap mass was extruded through the perforated barrier and compacted into billet form by the extended cone. The billet was then cut and pressed. The very visible, uniform, orderly and consistent striation pattern was obtained on the bars.

EXAMPLE 2

The same equipment set-up as in Example 1 was used. The 80/20 tallow/coconut fatty acid blend sodium soap pellets were used. The pellets contained of 17–18% moisture, petrolatum, 1% glycerin, and 1% superfat, which generated by in-situ of phosphoric acid with neat soap at the crutcher. These soap pellets were amalgamated with fragrance, polyquat, dimethicone and 20% titanium dioxide coated mica slurry which consisted of 0.2% mica with 0.4% glycerin and 0.4% water (by weight on the finished bar), and colorant. This soap mixture was processed as in Example 1. The very visible (however, lesser than 5% glycerin soap), uniform, orderly and consistent striation pattern was obtained on the bars.

EXAMPLE 3

A study was conducted to compare this invention with prior art (1) the Wood-Rethwill et al, U.S. Pat. No. 4,879,063. Two trials were conducted on the same basic equipment, formula and process as in Example 1. The first was on a compact plate with 13 mm ID holes and a worm opening-to-compact plate ratio of 2.1. The second was a compact plate with 10 mm ID holes and a worm opening-to-compact plate opening ratio of 2.4. The soap was extruded on a standard cone with 42 mm diameter extrusion plate. A very, very fine, non-uniform and inconsistent striation pattern and a "milky" appearance resulted.

It should be noted that the use of higher quantities of glycerin, i.e. about 3, 4, or 5 wt % glycerine brings about sharper, more visible striations than those in lower content glycerine bars. Generally, no more than about 6, 7, or 8 wt % glycerine need be used.

What is claimed is:

1. A process for preparing a cleansing bar having well-defined platelet striations therein by extruding a cleansing bar composition having platelets therein through an extruder having a perforated barrier across the cross section of the extrudor, a spider, and an extruder cone downstream of the spider to form a cleansing bar, the improvement comprising:

providing the perforated barrier a distance downstream of the spider equal to at least about 60% of the distance from the spider to an outlet of the extruder cone so as to prepare the cleansing bar having well-defined platelet striations therein, wherein the well-defined platelet striations are observed in the finished cleansing bar when viewed with the human eye.

2. The process of claim 1, wherein the distance is equal to at least 70% of the distance from the spider to the outlet of the extruder cone.

3. The process of claim 1, wherein the length of the extruder cone from the spider to the outlet of the extruder cone is about 483 mm to about 560 mm.

4. A process for preparing a cleansing bar having well-defined platelet striations therein by extruding a cleansing bar composition having platelets therein through an extruder having a spider, an extruder cone downstream of the spider, a smaller cone disposed within the extruder cone, and a perforated barrier across the cross section of the extruder cone or the smaller cone to form a cleansing bar, the improvement comprising:

providing said perforated barrier at a location substantially displaced downstream from the extruder spider and at a distance equal to at least about 60% of the distance from the spider, to an outlet of the extruder cone so as to prepare the cleansing bar having well-defined platelet striations therein, wherein the well-defined platelet striations are observed in the finished cleansing bar when viewed with the human eye.

* * * * *